No. 702,016. Patented June 10, 1902.
J. H. LUBBERS.
METHOD OF DRAWING GLASS.
(Application filed Oct. 9, 1901.)
(No Model.) 3 Sheets—Sheet 2.
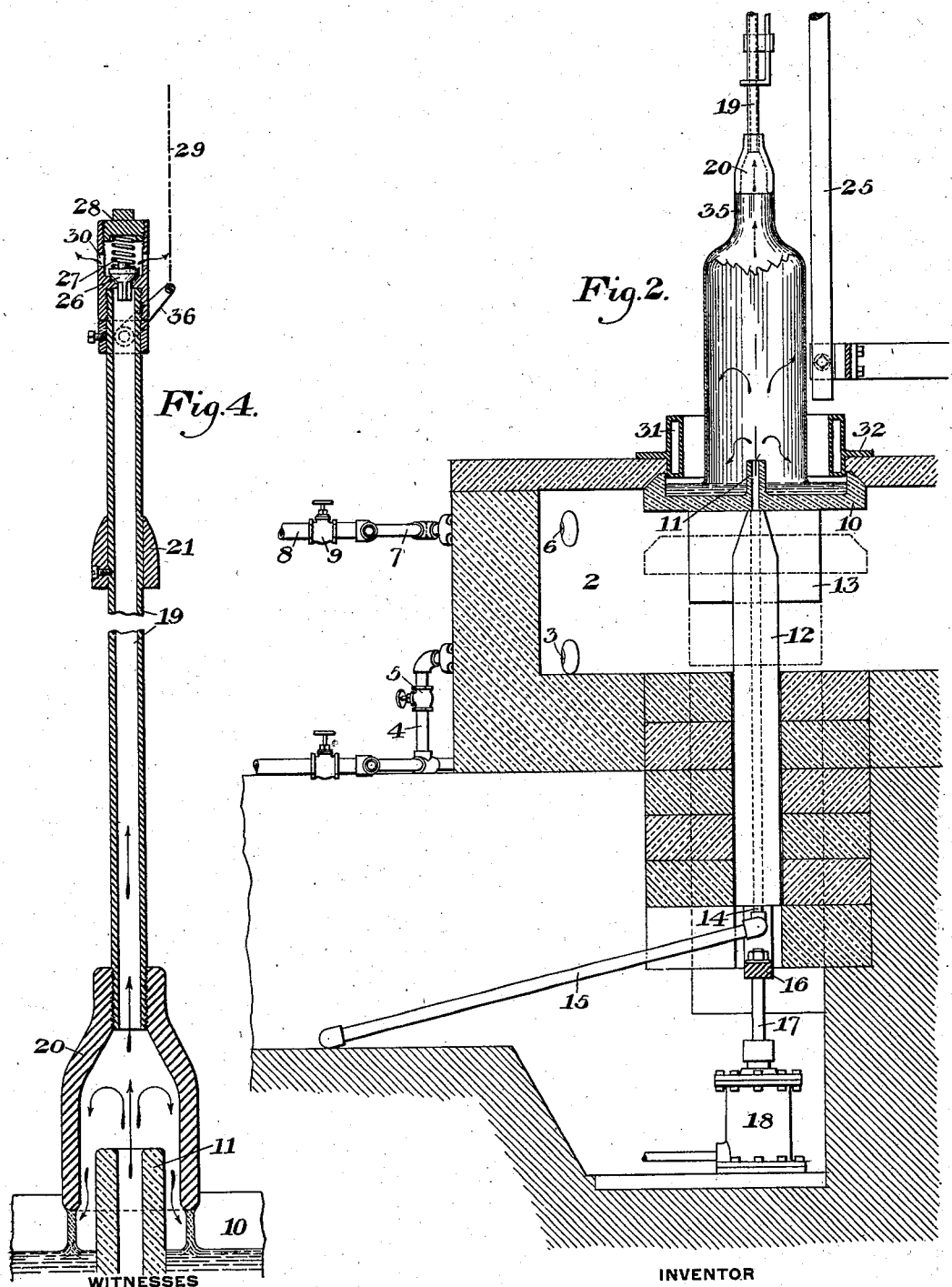

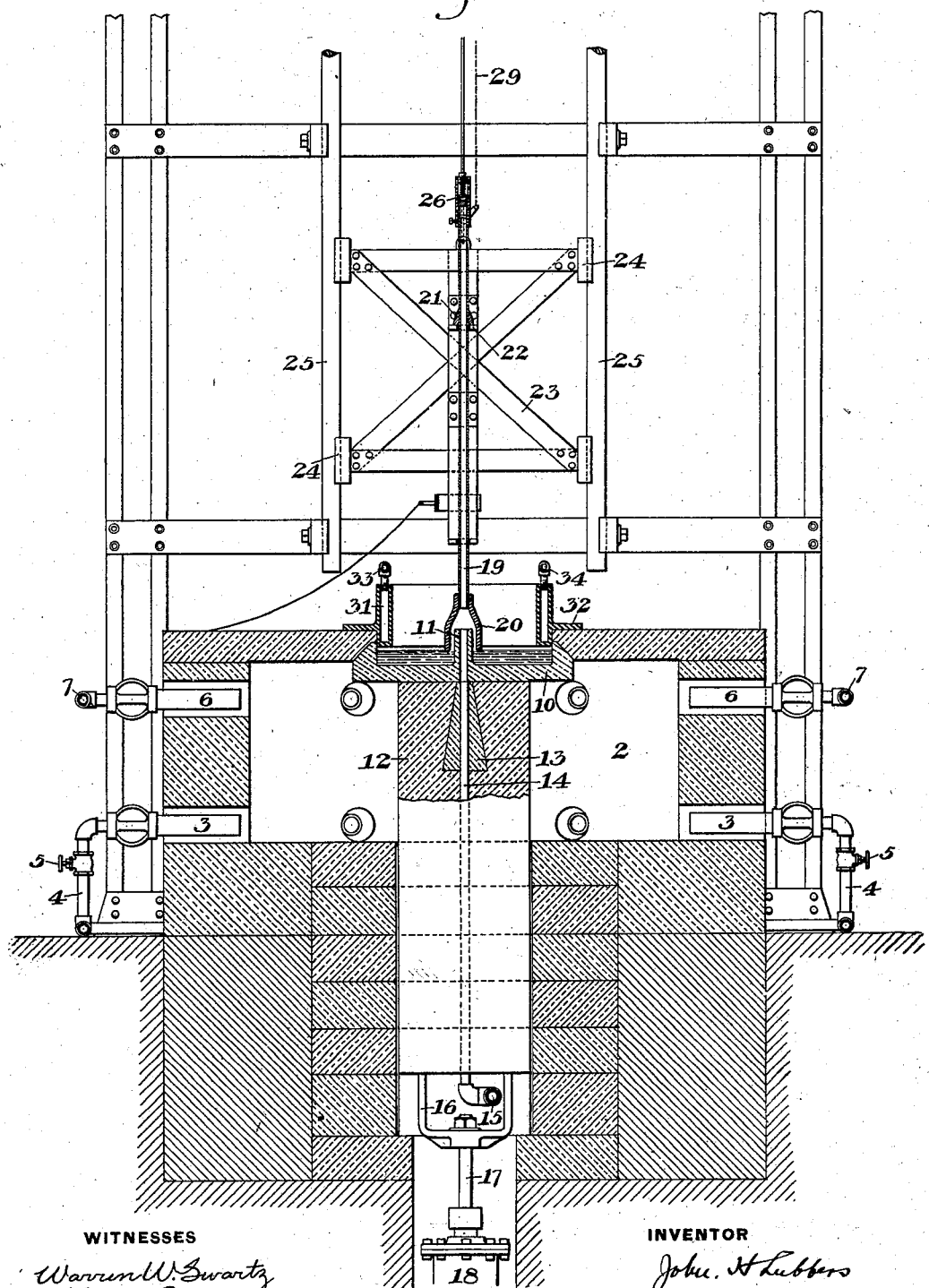

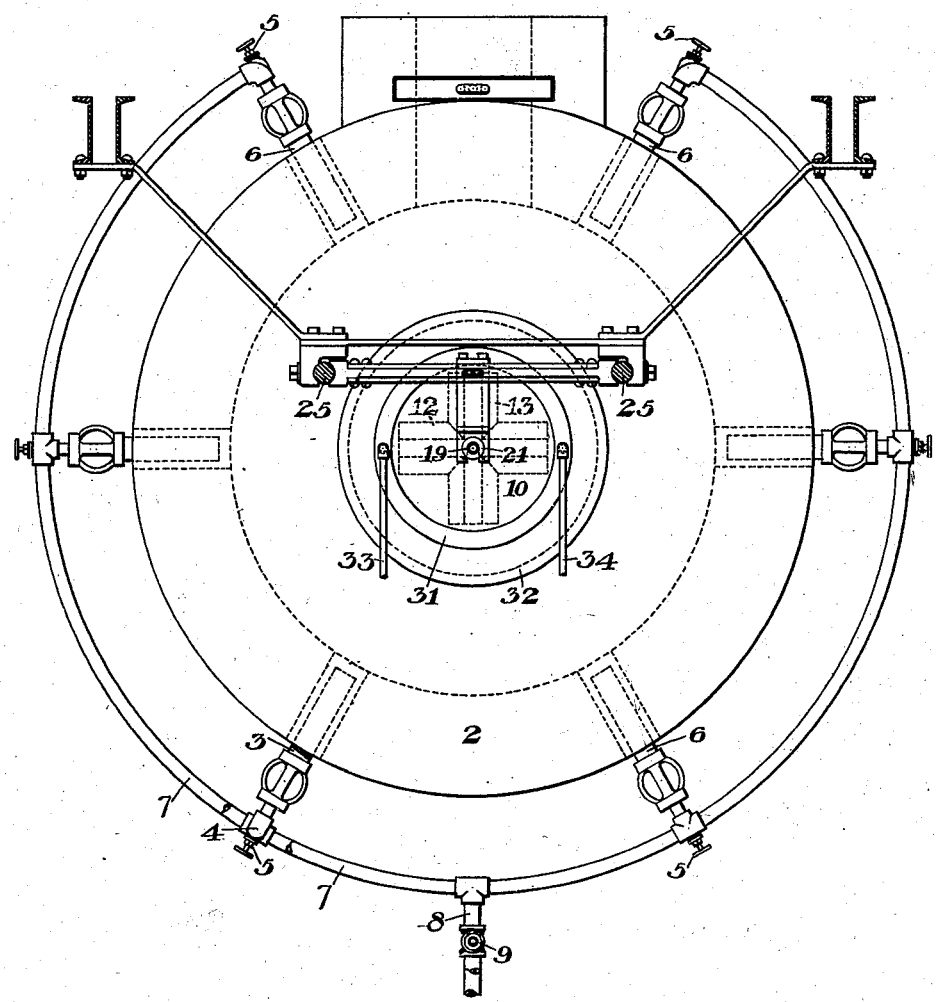

UNITED STATES PATENT OFFICE.

JOHN H. LUBBERS, OF NEW KENSINGTON, PENNSYLVANIA, ASSIGNOR, BY DIRECT AND MESNE ASSIGNMENTS, TO JAMES A. CHAMBERS, TRUSTEE, OF PITTSBURG, PENNSYLVANIA.

METHOD OF DRAWING GLASS.

SPECIFICATION forming part of Letters Patent No. 702,016, dated June 10, 1902.

Application filed October 9, 1901. Serial No. 78,122. (No specimens.)

*To all whom it may concern:*

Be it known that I, JOHN H. LUBBERS, of New Kensington, in the county of Westmoreland and State of Pennsylvania, have invented a new and useful Method of Drawing Glass, of which the following is a full, clear, and exact description, reference being had to the accompanying drawings, forming part of this specification, in which—

Figure 1 is a partial sectional elevation showing apparatus arranged for the practice of my process. Fig. 2 is a similar view at right angles to Fig. 1. Fig. 3 is a sectional top plan view; and Fig. 4 is an enlarged vertical section of the drawing-tool, showing the beginning of the drawing operation.

My invention relates to the drawing of glass cylinders or hollow glass articles from a bath of molten glass, and is designed to provide an improved method whereby commercial rollers or other hollow glass articles may be produced.

To that end the invention consists in continuously supplying air or other gaseous fluid to the interior of the cylinder and allowing it to escape therefrom, thus producing a current through the interior of the hollow article being drawn, and, further, in maintaining a substantially constant pressure within the article during the drawing operation in connection with the use of the current.

It also consists in providing a pot or receptacle for the glass and in raising and lowering the same at certain intervals between the drawing operations and, further, in the combinations of steps hereinafter described and claimed.

In the drawings, in which I show my preferred form of apparatus for carrying out my process, 2 represents a furnace, which I have shown of cylindrical form, though other forms may be used, and which is preferably heated by a series of lower gas-burners 3, each having a gas-supply pipe 4, controlled by hand-valve 5. These burners project through holes in the side walls, and I also preferably provide an upper series of similar burners 6, which are connected to a common supply-pipe 7, extending around the furnace and receiving gas from a pipe 8, having valve 9. These upper burners are used principally for assisting in severing the article from the bath. The pot or receptacle 10 to contain the glass is of annular form, with a central hollow boss or raised portion 11, which extends upwardly above the level of the bath. The pot is carried upon a refractory support 12, which may be rectangular in cross-section and is provided with an upper transversely-extending refractory block 13, giving a cross-shaped portion at the top for the pot. A gaseous supply-pipe 14 extends centrally and longitudinally through the support 12 and is connected at its lower end to a swinging supply-pipe 15, connected to a source of compressed air.

The support 12 is carried upon an iron block 16, secured to the piston-rod 17 of the motive cylinder 18. The drawing-tool 19 is of substantially the form of a glass-blower's pipe, the lower end portion 20 forming a bait which surrounds the nipple or hollow boss 11 when it is dipped into the bath. The pipe is provided with a ring 21, which rests upon a forked support 22, carried on the frame 23, having side guides 24, sliding upon vertical guide-rods 25.

The upper end of the pipe is closed by a valve 26, which seats downwardly and is held yieldingly to its seat by a spiral spring 27, the pressure of which may be adjusted by a screw-plug 28. The drawing rope or cable 29 is secured by yoke 36 to the valve-chamber, which chamber is provided with side outlets 30, through which the air may escape to the outer air whenever the pressure is sufficient to overcome the force of the closing-spring.

A water-cooled ring 31 is removably seated within the hole in the top of the furnace in which the pot fits when in upper position, this ring being supported by a suitable flange 32 and having inlet and outlet pipes 33 and 34. A constant circulation of water or cooling fluid is maintained through this cooling-ring.

In carrying out my process the pot having been heated and provided with molten glass is held in its upper position, in which its sides shield the surface of the bath from the heat within the furnace-chamber. The drawing-tool is then lowered into the bath, and air being supplied through pipes 15 and 14 the tool is drawn upwardly. The air-pressure is first regulated to form the neck portion 35, as shown in Fig. 2, and is then increased to swell out the glass to the size of the cylinder desired. The air is then allowed to flow upwardly into this cylinder during the drawing operation, and a substantially constant pressure is obtained therein by reason of the check-valve, which lifts as the pressure rises above a certain limit, the air-supply being sufficient to at least hold the pressure uniform as the cylinder increases in length. A circulation of air or cooling gaseous fluid is thus maintained through the article, which serves to chill its inner surface, while the water-cooled ring chills the outer surface of the article at or near the drawing-point. When an article of the desired length is obtained, the air is shut off to cause the lower end of the article to contract, and the pot is then lowered and the upper burners turned on, thus causing a cutting-flame to impinge upon the lower end of the article and sever it from the bath. The water-cooled ring is then removed and a cover placed over the hole, and the heat in the furnace raises the temperature of the remaining glass in the pot and prepares it for the next drawing operation. The glass may be ladled into the pot as needed.

The advantages of the invention flow from allowing the circulating of the gaseous fluid through the cylinder or article during the drawing operating while maintaining a pressure therein, from raising and lowering the pot for heating between the drawing operations, and from the other steps above recited.

The use of the outer water-cooled ring may be dispensed with, the air may be supplied to and from the interior of the article in other ways, and the apparatus may be widely varied without departing from my invention.

I claim—

1. The method of forming hollow glass articles, consisting in drawing a hollow article from a bath of molten glass, and allowing a flow of gaseous fluid through the interior of the article; substantially as described.

2. The method of forming hollow glass articles, consisting in drawing the hollow article from a bath of molten glass, supplying a gaseous fluid to the interior of the article, and maintaining a substantially constant pressure therein by allowing the fluid to escape when the pressure rises above a determined limit; substantially as described.

3. The method of forming hollow glass articles, consisting in drawing a hollow article from a bath of molten glass, continuously supplying a gaseous fluid to the lower end of the article being drawn, and automatically withdrawing the fluid from the upper end of the article when the pressure rises above a certain limit; substantially as described.

4. The method of drawing glass articles, consisting in feeding glass to a receptacle, drawing an article therefrom while shielding the article from heat adjacent to the drawing-point, severing the article from the bath, and then heating the surface of the bath; substantially as described.

5. The method of drawing glass articles, consisting in supplying glass to a receptacle, heating the receptacle, raising the receptacle to cut off the heat from the drawing-point, drawing the article from the bath, and then lowering the pot and heating the surface of the glass therein; substantially as described.

6. The method of forming hollow glass articles, consisting in drawing the hollow article from a bath of molten glass, allowing a circulation of gaseous fluid through the interior of the article, and chilling the outer face of the article at or near the drawing-point; substantially as described.

In testimony whereof I have hereunto set my hand.

J. H. LUBBERS.

Witnesses:
H. M. CORWIN,
C. P. BYRNES.